US010270200B2

(12) United States Patent
Eder (10) Patent No.: US 10,270,200 B2
(45) Date of Patent: Apr. 23, 2019

(54) LOAD CONNECTOR FOR TRANSMITTING ELECTRICAL CURRENT, PARTICULARLY FOR USE IN A MOTOR VEHICLE

(71) Applicant: Bayerische Motoren Werke Aktiengesellschaft, Munich (DE)

(72) Inventor: Georg Eder, Moosburg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/205,276

(22) Filed: Jul. 8, 2016

(65) Prior Publication Data

US 2016/0322737 A1  Nov. 3, 2016

Related U.S. Application Data

(63) Continuation of application No. PCT/EP2014/078460, filed on Dec. 18, 2014.

(30) Foreign Application Priority Data

Jan. 9, 2014  (DE) .................... 10 2014 200 176

(51) Int. Cl.
*H01R 13/11* (2006.01)
*H01R 13/41* (2006.01)
(Continued)

(52) U.S. Cl.
CPC .......... *H01R 13/447* (2013.01); *B60R 16/023* (2013.01); *H01R 13/113* (2013.01);
(Continued)

(58) Field of Classification Search
CPC ............ H01R 13/4226; H01R 13/4223; H01R 13/4364; H01R 13/4362; H01R 13/4361;
(Continued)

(56) References Cited

U.S. PATENT DOCUMENTS 4,973,268 A * 11/1990 Smith ................ H01R 13/443
439/589
5,516,308 A * 5/1996 Yamanashi ........ H01R 13/4362
439/752
(Continued)

FOREIGN PATENT DOCUMENTS

CN        102891385 A      1/2013
DE   20 2004 013 160 U1   2/2005
(Continued)

OTHER PUBLICATIONS

International Search Report (PCT/ISA/210) issued in PCT Application No. PCT/EP2014/078460 dated Mar. 19, 2015 with English translation (Four (4) pages).
(Continued)

*Primary Examiner* — Gary F Paumen
(74) *Attorney, Agent, or Firm* — Crowell & Moring LLP (57) ABSTRACT

A load connector is provided for transmitting electrical current, particularly for use in a motor vehicle. The load connector has a housing in which a metallic spring contact is provided for supplying electrical current from a current line. The spring contact establishing a force-fitting contact with a metallic flat pin of a corresponding connection when the load connector is connected to the connection. The load connector is characterized in that its housing is closed by a housing cap, on inner side of which has a contour designed such that the spring contact is form-fittingly secured in the housing by way of the contour.

11 Claims, 6 Drawing Sheets

(51) Int. Cl.
*H01R 13/53* (2006.01)
*B60R 16/023* (2006.01)
*H01R 13/447* (2006.01)

(52) U.S. Cl.
CPC ............. *H01R 13/41* (2013.01); *H01R 13/53* (2013.01); *H01R 2201/26* (2013.01)

(58) Field of Classification Search
CPC .... H01R 13/447; H01R 13/113; H01R 13/53; H01R 2201/26; B60R 16/023
USPC .................................................. 439/752, 595
See application file for complete search history.

(56) References Cited

U.S. PATENT DOCUMENTS

| | | | | |
|---|---|---|---|---|
| 5,573,432 | A * | 11/1996 | Hatagishi | H01R 13/506 439/459 |
| 6,000,967 | A * | 12/1999 | Norizuki | H01R 13/4362 439/596 |
| 6,027,374 | A * | 2/2000 | Nagai | H01R 13/4361 439/596 |
| 6,250,972 | B1 * | 6/2001 | Shinchi | H01R 13/504 439/465 |
| 6,648,700 | B1 * | 11/2003 | Greiner | H01R 13/64 439/382 |
| 6,676,448 | B2 * | 1/2004 | Kato | H01R 13/4223 439/595 |
| 6,695,645 | B2 * | 2/2004 | Takahashi | H01R 13/432 439/596 |
| 6,780,070 | B2 * | 8/2004 | Ishikawa | H01R 13/4362 439/752 |
| 6,939,171 | B2 * | 9/2005 | Fukatsu | H01R 13/4223 439/595 |
| 7,690,933 | B1 | 4/2010 | Smith | |
| 7,785,146 | B2 * | 8/2010 | Chazottes | H01R 13/4365 439/595 |
| 7,963,790 | B1 | 6/2011 | Winter, Jr. | |
| 8,721,374 | B2 * | 5/2014 | Glick | H01R 13/426 439/596 |
| 8,727,816 | B2 * | 5/2014 | Takahashi | H01R 13/4361 439/595 |
| 8,905,797 | B2 * | 12/2014 | Wu | H01R 13/4367 439/752 |
| 2001/0029132 | A1 * | 10/2001 | Kuroda | H01R 13/432 439/752 |
| 2002/0076992 | A1 * | 6/2002 | Kurimoto | H01R 13/4362 439/752 |
| 2004/0132352 | A1 * | 7/2004 | Ward | H01R 13/4365 439/752 |
| 2006/0068647 | A1 * | 3/2006 | Kojima | H01R 13/4223 439/752 |
| 2013/0023163 | A1 | 1/2013 | Glick et al. | |

FOREIGN PATENT DOCUMENTS

| | | |
|---|---|---|
| DE | 20 2010 003 555 U1 | 8/2010 |
| DE | 20 2011 000 947 U1 | 12/2011 |
| DE | 20 2006 021 113 U1 | 1/2013 |

OTHER PUBLICATIONS

German-language Written Opinion (PCT/ISA/237) issued in PCT Application No. PCT/EP2014/078460 dated Mar. 19, 2015 (Six (6) pages).

German-language Search Report issued in counterpart German Application No. 10 2014 200 176.5 dated Dec. 9, 2014 with partial English translation (Twelve (12) pages).

English translated Chinese Office Action issued in counterpart Chinese Application No. 201480072629.5 dated May 10, 2018 (6 pages).

* cited by examiner

LOAD CONNECTOR FOR TRANSMITTING ELECTRICAL CURRENT, PARTICULARLY FOR USE IN A MOTOR VEHICLE

CROSS REFERENCE TO RELATED APPLICATIONS

This application is a continuation of PCT International Application No. PCT/EP2014/078460, filed Dec. 18, 2014, which claims priority under 35 U.S.C. § 119 from German Patent Application No. 10 2014 200 176.5, filed Jan. 9, 2014, the entire disclosures of which are herein expressly incorporated by reference.

BACKGROUND AND SUMMARY OF THE INVENTION

The invention relates to a load connector for transmitting electrical current, in particular for use in a motor vehicle.

Load connectors are often used in motor vehicles to carry and thus distribute the electrical power from a battery (such as an on-board battery, for example) to a corresponding connection. Such load connectors often have a metallic spring contact that accommodates a flat pin of the connection connected to the load connector to ensure a power transmission in this way. In doing so, vibrations in the vehicle may cause relative movement between the spring contact and the housing of the load connector, which in turn leads to movement between the spring contact and the flat pin inserted therein. The friction corrosion caused by this leads to wear by friction of highly conductive coatings on the spring contact and the flat pin. This results in an increase in the contact resistance between the spring contact and the flat pin, which can lead to power failure and potentially also to an overheating with corresponding damage in the vehicle.

The object of the invention is therefore to create a load connector for electrical current transmission, which ensures a safe and reliable contact to a corresponding flat pin.

This and other objects are achieved according to the invention by a load connector for transmitting electrical current, in particular for use in a motor vehicle, comprising a housing in which a metallic spring contact is provided for supplying electrical current from a current line, with the spring contact establishing a force-fitting contact with a metallic flat pin of a corresponding connection when the load connector is connected to the connection, wherein the housing is closed by a housing cap, the inside of which has a contour designed such that the spring contact is form-fittingly secured in the housing by way of the contour.

The purpose of the load connector according to the invention is to transmit electrical current, and it is used in particular in a motor vehicle. The load connector is preferably provided for the transmission of high current. High current is understood to be a current of several amperes, in particular of 10 ampere and more, and preferably of 50 ampere or 100 ampere or more. The load connector according to the invention comprises a housing in which a metallic spring contact is provided for supplying electrical current from a current line, with the spring contact establishing a force fit contact with a metallic flat pin of a corresponding connection when the load connector is connected to said connection.

The load connector is characterized in that the housing is closed by a housing cap which has on its inner side (e.g., the side facing the inside of the housing) a contour shaped such that the spring contact is form-fittingly secured in the housing by way of the contour. In addition to the form fit, the contour can also effect a securing by way of a force fit. In doing so, it is not necessary that the form fit or force fit is achieved directly between the contour and the spring contact. The form fit or force fit can be achieved between the contour and any components as long as this results in securing the spring contact in the housing.

The contour in the housing cap facilitates a stiffening of the spring contact within the housing, which largely eliminates relative movement between the spring contact and the housing and, consequently, a relative movement between the spring contact and the inserted flat pin. In this way, there is essentially no more wear by friction between the spring contact and the flat pin and the problem mentioned earlier, which is high contact resistances that can lead to power failure and overheating, is eliminated. The housing of the load connector as well as the housing cap described above are preferably made of plastic. Furthermore, the metallic spring contact is provided with a metal coating, preferably a highly conductive metal coating such as tin or silver. Preferably, such a coating is also applied on the flat pin.

In an especially preferred embodiment, the contour of the housing cap has a plurality of webs that protrude into the inside of the housing. For an efficient securing of the spring contact in the housing, in a preferred variant at least part of the contour abuts a metallic connecting section that connects one end of the current line inside the housing to the spring contact. Alternately or in addition, at least part of the contour can abut an end of the current line inside the housing. Likewise, at least part of the contour can abut a corresponding contour of the inside of the housing. In the case that the contour is developed by webs that protrude into the inside of the housing, in another preferred variant the end of the current line is arranged inside the housing and/or the connecting section is arranged between at least part of the webs.

Preferably, the housing cap is detachably secured at the housing. The housing cap can include one or a plurality of engagement elements, which engage in corresponding noses of the housing to secure the housing cap at the housing (in particular for a detachable fastening). In this way, it is possible to provide, in a simple fashion, a housing cap on the load connector even later on and/or the housing of the load connector can be easily opened.

Preferably, at least one pair of opposite legs with engagement openings is provided as engagement elements, which are inserted into the corresponding noses. The opposite legs are preferably developed elastically so that they are pressed apart by the noses as they slide over the noses, until the noses are completely in the engagement openings and the legs move back to their original position again. In this way, a simple and efficient securing of the housing cap at the housing is achieved.

In a further preferred embodiment, the contour is arranged between the legs of at least one pair of opposite legs. In this way, an efficient securing of the contour is achieved inside the housing. Alternately or in addition, it is also possible to arrange a section of the current line between the legs of at least one pair of opposite legs.

In a further embodiment, the spring contact of the load connector according to the invention includes a pair of opposite, bent sections between which the flat pin of the connection is arranged when the connection is connected to the load connector, with the bent sections preferably being spring lamellae. In this way, a good force connection between the spring contact and the flat pin is achieved.

In addition to the load connector described above, the invention furthermore includes a motor vehicle, in particular a passenger car or a truck, with the motor vehicle having one or a plurality of the load connectors according to the invention and/or one or a plurality of preferred variants of the load connector according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, an embodiment of the invention is described based on a load connector that creates a connection between a high current line carrying current from a battery and a device terminal, such as a power distributor, in motor vehicles.

Figure 1:
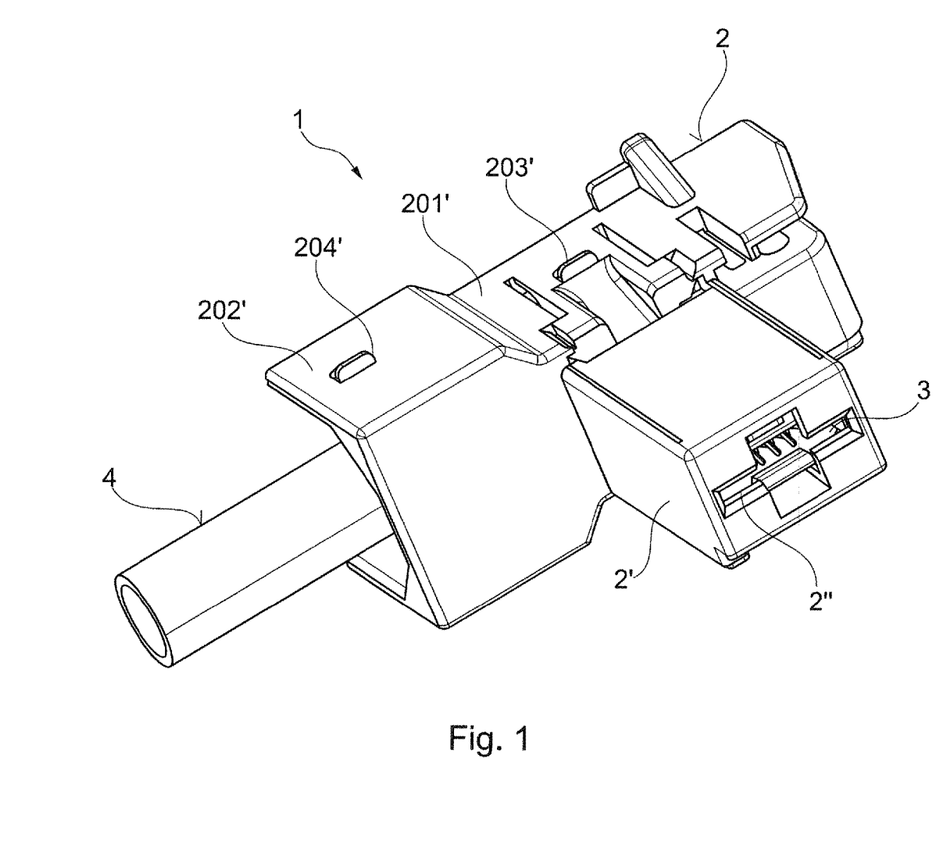
FIG. 1 to FIG. 3 are perspective views of a load connector on which a housing cap according to an embodiment of the invention can be secured.

FIG. 1 shows a perspective view of such a load connector 1. The connector includes a housing 2 with a protruding housing section 2', on the front side of which is an opening 2" into which a flat pin (not shown) of a connection to be connected to the load connector is inserted for contacting a metallic spring contact 3. In this case, the flat pin represents a flat metallic conductor that is positioned between two opposite metallic spring lamellae of the spring contact 3 and held there by way of spring force. The spring lamellae are described in greater detail further below with reference to FIG. 2 and FIG. 3.

The spring contact 3 is connected via metallic sections (not shown in FIG. 1) to a high current line 4, which is led out of the housing 2 perpendicular to the section 2'. In the representation in FIG. 1, the rear side of the load connector is shown open. However, when the load connector is used as intended, this side is closed by a housing cap covering a rear face of the housing, as will be explained in greater detail with reference to FIG. 4 to FIG. 6. To secure the housing cap, corresponding noses 203, 203' and/or 204, 204' are provided at the housing in opposite housing sections 201, 201' and/or 202, 202', with only the housing sections 201' and 203' as well as the noses 203' and 204' being shown in the perspective representation in FIG. 1. Via corresponding engagement elements of the housing cap (see FIG. 4 to FIG. 6), which engage in the noses, the housing cap is secured on the housing 2. The structure of the connector as such shown in FIG. 1 is known. Therefore, not all components of the shown load connector will be explained in detail. The novelty of the invention is the use of the housing cap, which is described below.

Figure 2:
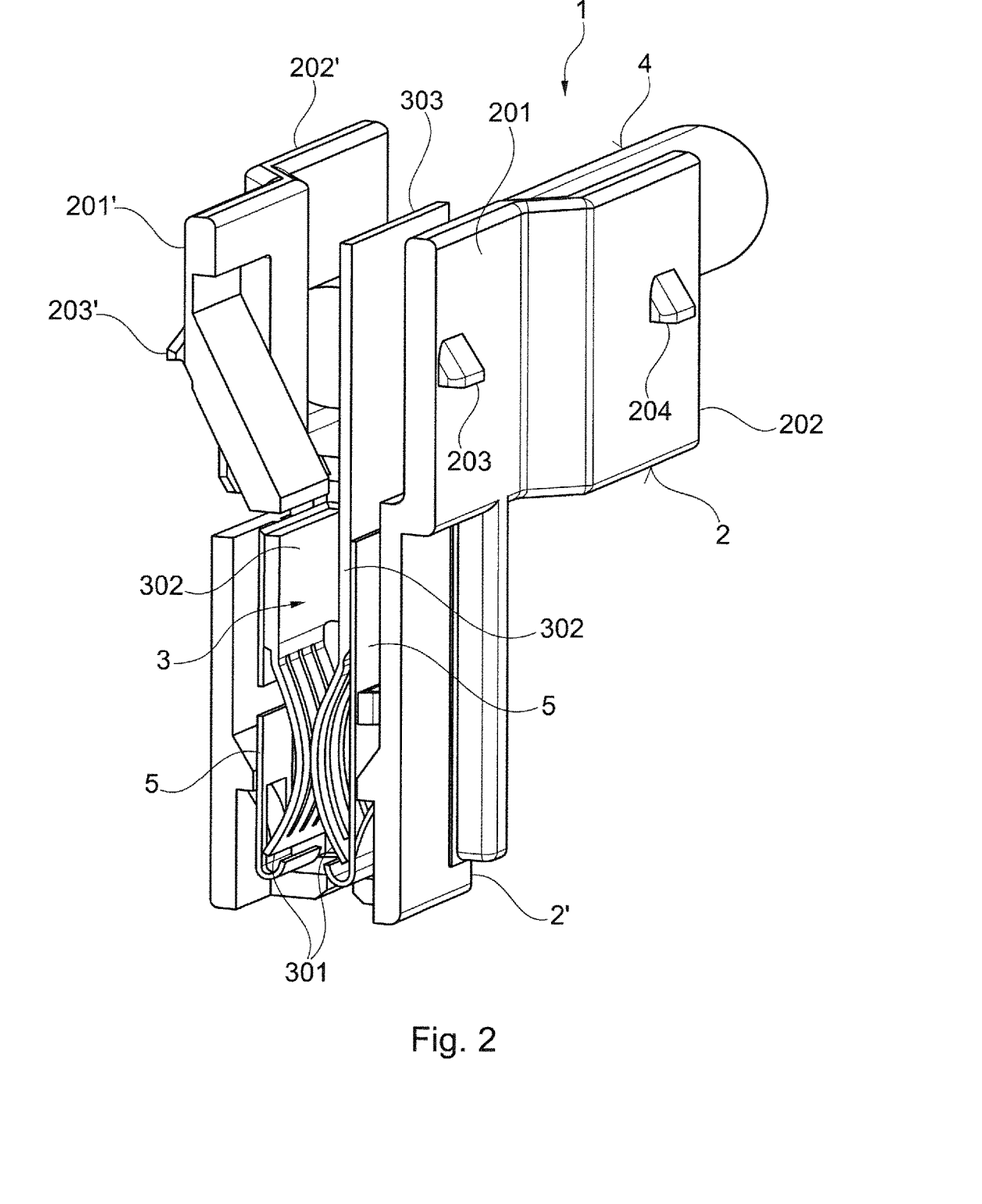

FIG. 2 shows a perspective view of the load connector in FIG. 1, with the illustration being cut along a plane perpendicular to the current line 4 so as to expose the internal structure of the load connector. In particular, the spring contact 3 is shown in FIG. 2, which has two opposite, inwardly bent spring lamellae 301 with longitudinal incisions provided therein. From the spring lamellae, which form the actual spring contact, metallic sections 302 extend upward and end in a shared metallic connecting section 303. A metallic bridge section (not shown in FIG. 2) extends between the metallic sections 302. The connecting section 303, which in the following is also referred to as a contact tab, is connected to the conductor of the current line 4, as shown in FIG. 3.

The spring lamellae 301 as well as the sections 302 and 303 consist of a bronze alloy that is coated with tin or, if applicable, also with silver so as to achieve good conductivity to the flat pin of the mating connection, with the flat pin also being provided with a metallic coating, for example a silver coating. FIG. 2 furthermore shows that the spring lamellae 301 and the metallic sections 302 are inserted in a so-called metallic external enclosure spring 5. Furthermore, the housing section 201 as well as the housing section 202 is visible, which have corresponding noses 203 and/or 204. In the perspective representation in FIG. 1, the housing sections with the corresponding noses were arranged on the underside and therefore obscured.

Figure 3:
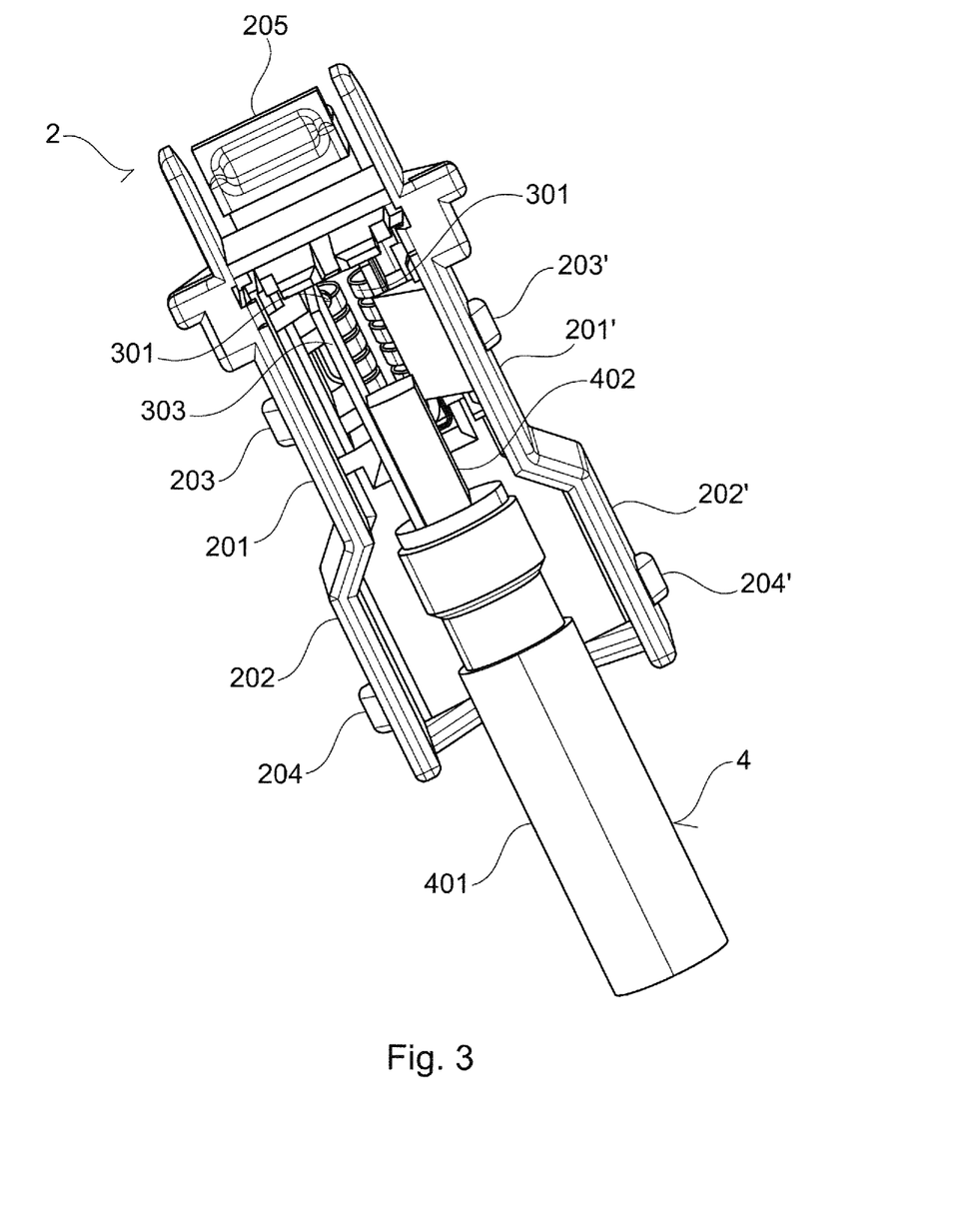

FIG. 3 shows a perspective representation of the rear region of the connector in FIG. 1. In the figure, the structure of the current line 4 is shown. In particular, it shows that the metallic current conductor 402 extends from the insulation 401 of the current line 4 into the housing 2. The front end of the current conductor is connected to the contact tab 303 via a solder connection. Also shown is a snap-in nose 205 provided at the housing 2, via which the housing is interlocked in the housing of the mating connection having the flat pin in a generally known manner.

Conventionally, a flat lid is placed on the upper side of the housing shown in FIG. 3, without the lid interacting with the components in the inside of the housing. This, however, has the disadvantage that relative movements may occur between the spring contact 3 and the housing 2, for example due to a movement of the current cable 4, which is often bent in the vicinity of the load connector due to a lack of installation space and exerts pressure on the spring contact. Consequently, a movement between the spring lamellae of the spring contact and the flat pin inserted therein occurs, which leads to wear by friction of the coatings of the flat pin and the spring lamellae. As a result, the transition resistance increases, which can lead to power failure or also to overheating.

To avoid the problems described above, the housing cap 6 shown in FIG. 4 is used in the embodiment described here, which is placed on the upper side of the housing 2 in FIG. 3. The housing cap has a rear section 601 which is open on the front side. A larger opening 602 as well as two smaller openings 603 are provided at the upper side of the section 601. Furthermore, a U-shaped hook protrudes from the opened front side of the section 601, which includes two legs 604 with engagement openings 605 arranged therein. When the housing cap is placed on the upper side of the housing 2, the legs 604 are pressed apart by the slanted surfaces of the two noses 204 and 204' until the noses finally engage in the openings and in this way interlock the housing cap on the housing.

Figure 5:
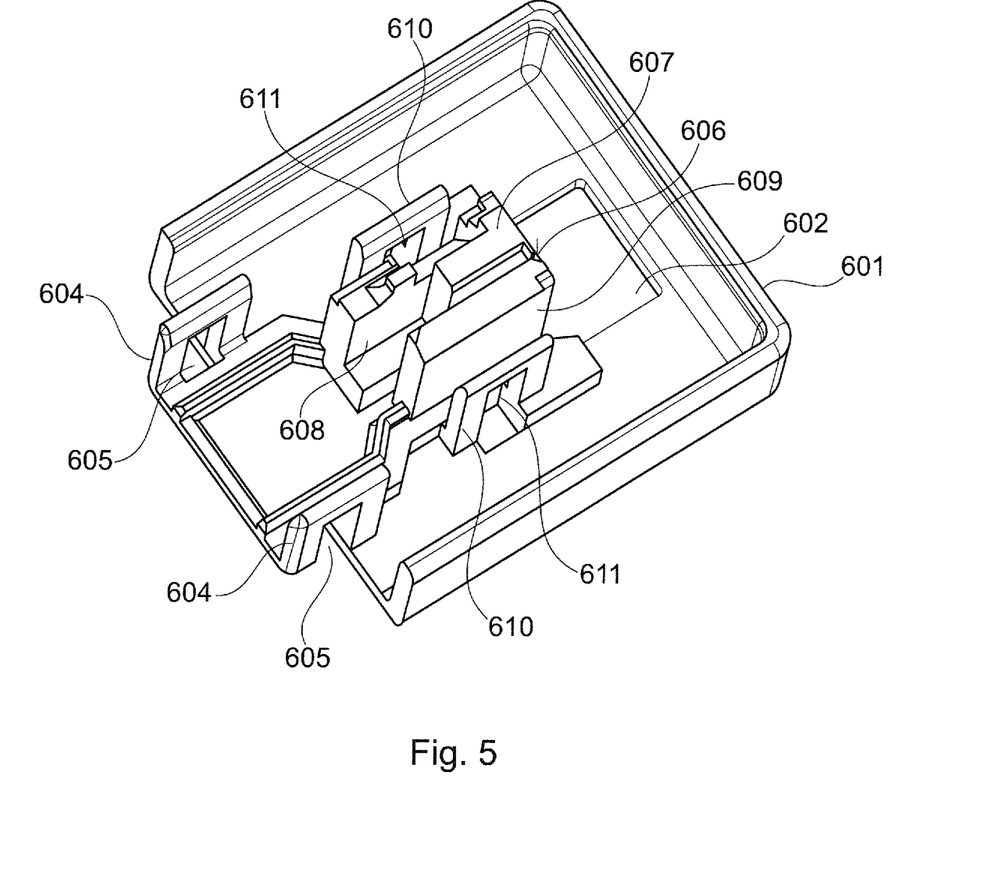
FIG. 5 is a perspective view from the bottom of the housing cap in FIG. 4.

Furthermore, two additional legs 610 with corresponding openings 611 are provided for interlocking, which are arranged under the openings 603 (see FIG. 5). In the same way as the legs 604, the legs 610 interact with the two other noses 203 and 203'. This means that because of the slanted areas of the noses, the two legs 610 are pressed apart when the housing cap is placed on the housing, until the noses finally engage in the engagement openings and thereby interlock the housing cap at the housing. To detach the housing cap from the housing, the legs 604 and/or 610 can be pressed apart again, for which purpose an appropriate tool can be inserted into the openings 603.

After the housing cap 6 has been placed on the housing 2, the snap-in nose 205, via which a connection to the mating connection containing the flat pin is established when the load connector is connected in the vehicle, is in the opening 602. By engaging in the opening 602 with an appropriate tool, the interlocking effected by the snap-in nose can be released and thus the housing can be removed from the corresponding mating connection.

Figure 4:
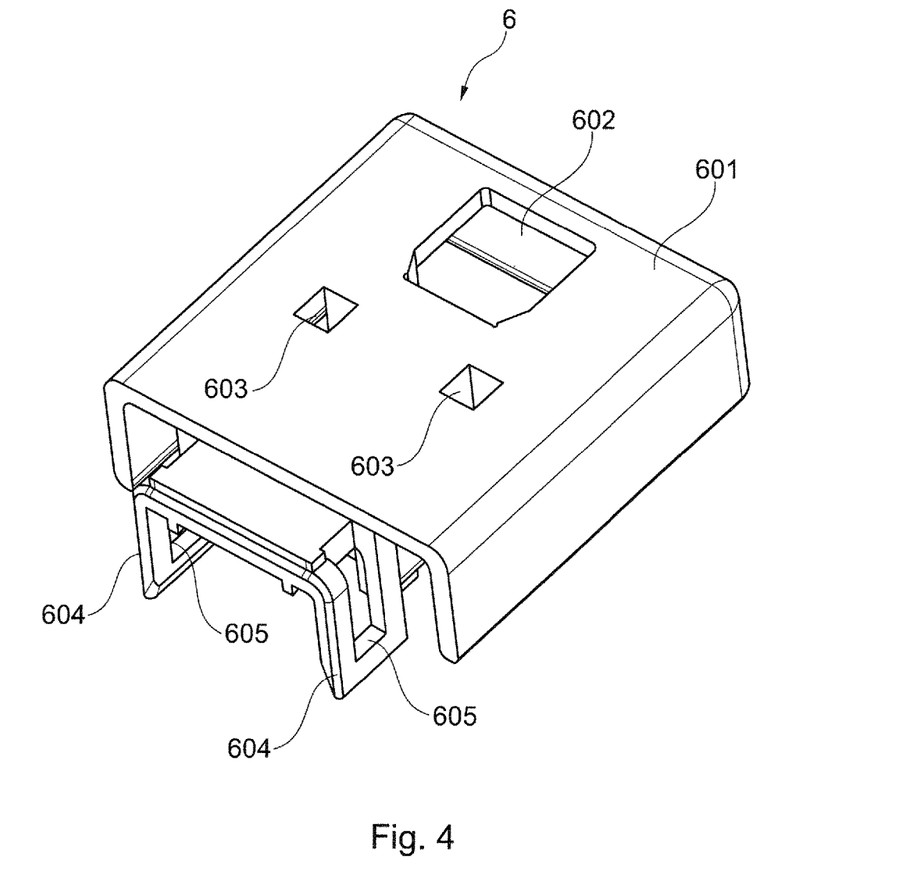
FIG. 4 is a perspective view from the top of a housing cap according to an embodiment of the invention.

FIG. 5 shows the underside of the housing cap 6 in FIG. 4. In addition to the two legs 610 with engagement openings 611, which have already been explained above, a shown element that is essential to the invention is a contour 606 in form of a multiplicity of webs; for the sake of clarity, not all webs have been designated with reference symbols. In particular, the contour 606 includes an L-shaped web 608 that is spaced apart from a web 609. Furthermore, the web 607 is arranged on the short leg of the web 608. The webs of the contour are arranged between the two legs 610. The form of the contour and/or the webs is developed such that it generates a form fit to corresponding components inside the housing 2. In particular, the end of the conductor 402 rests with its underside on the upper side of the short leg of the L-shaped web 608, and the front side of the conductor abuts the web 607. Furthermore, a rearmost portion of the contact tab 303 is located in an intermediate space between the front edge of the L-shaped web 608 and the additional web 609.

The remaining contour of the webs also engages in appropriate corresponding contours in the housing. This creates a form fit so that the spring contact 3 is secured within the housing. In other words, the contour creates a stiffening of the spring contact inside the housing, which prevents relative movements of the spring contact relative to the housing and thereby the relative movement between the spring lamellae and the flat pin. In this way, a safe electrical contacting is achieved between the load connector and the corresponding mating connector.

Figure 6:
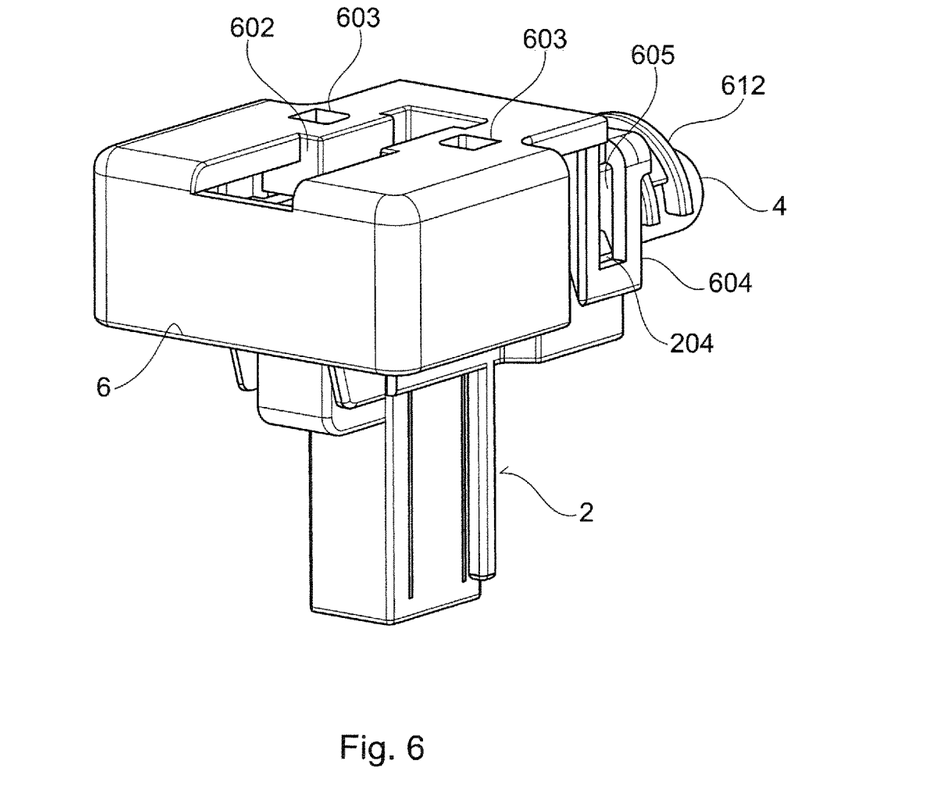
FIG. 6 is a load connector with housing cap disposed thereon according to a modified embodiment of the invention.

FIG. 6 shows the assembly of the housing 2 with a housing cap 6. The housing cap 6 in FIG. 6 largely corresponds to the housing cap shown in FIG. 4 and FIG. 5. Only the opening 602 on the upper side is developed slightly differently and furthermore, a semicircle-shaped protrusion 612 is provided at the front end of the housing cap in front of the legs 604. The protrusion 612 has two webs so that a guide is formed into which a cable tie can be placed to secure the current line 4 at the housing cap 6. FIG. 6 shows, in particular, how a corresponding nose 204 engages in the engagement opening 605 of a leg 604. This effects an interlocking of the housing cap at the housing.

REFERENCE SYMBOLS

1 Load connector
2 Housing
201, 201', 202, 202' Housing sections
203, 203', 204, 204' Noses
205 Snap-in nose
2' Housing section
2" Opening
3 Spring contact
301 Spring lamellae
303 Connecting section
4 Current line
401 Insulation
402 Conductor
5 Steel external enclosure spring
6 Housing cap
601 Rear section of the housing cap
602, 603 Openings
604, 610 Legs
605, 611 Engagement openings
606 Contour
607, 608, 609 Webs
612 Protrusion The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A load connector for transmitting electrical current, comprising:
    a housing in which a metallic spring contact is provided for supplying electrical current from a current line, the spring contact establishing a force-fitting contact with a metallic flat pin of a corresponding connection when the load connector is connected to the corresponding connection, wherein
    the housing containing the spring contact therein is subsequently closed by a housing cap covering a rear face of the housing,
    an inside of the housing cap has a contour configured such that the spring contact is form-fittingly secured in the housing via the contour,
    the contour comprises a plurality of webs protruding into an interior of the housing, and
    a rearmost portion of the spring contact is inserted from the rear face forwardly into an intermediate space formed between the plurality of webs when the housing is closed by the housing cap.

2. The load connector according to claim 1, wherein:
    at least part of the contour abuts a metallic connecting section that connects an end of the current line inside the housing to the spring contact,
    at least part of the contour abuts an end of the current line inside the housing, and/or
    at least part of the contour abuts a corresponding contour inside the housing.

3. The load connector according to claim 1, wherein:
    at least part of the contour abuts a metallic connecting section that connects an end of the current line inside the housing to the spring contact,
    at least part of the contour abuts an end of the current line inside the housing, and/or
    at least part of the contour abuts a corresponding contour inside the housing.

4. The load connector according to claim 2, wherein:
    the current line is arranged inside the housing, and/or
    the connecting section is arranged between at least parts of the webs.

5. The load connector according to claim 1, wherein the housing cap comprises one or more engagement elements, the one or more engagement elements engaging in corresponding noses of the housing to secure the housing cap at the housing.

6. The load connector according to claim 5, wherein the one or more engagement elements comprise at least one pair of opposite legs having engagement openings into which the corresponding noses are inserted.

7. The load connector according to claim 6, wherein the contour is arranged between the legs of the at least one pair of opposite legs, and/or a section of the current line is arranged between the legs of the at least one pair of opposite legs.

8. The load connector according to claim 1, wherein the spring contact comprises a pair of opposite bent sections between which the flat pin of the connection is arranged when the connection is connected to the load connector.

9. The load connector according to claim 8, wherein the bent sections are spring lamellae.

10. The load connector according to claim 1, wherein the load connector is configured for use in a motor vehicle.

11. A motor vehicle, comprising:
one or more load connectors, each load connector comprising:
a housing in which a metallic spring contact is provided for supplying electrical current from a current line, the spring contact establishing a force-fitting contact with a metallic flat pin of a corresponding connection when the load connector is connected to the corresponding connection, wherein
the housing containing the spring contact therein is subsequently closed by a housing cap covering a rear face of the housing,
an inside of the housing cap has a contour configured such that the spring contact is form-fittingly secured in the housing via the contour,
the contour comprises a plurality of webs protruding into an interior of the housing, and
a rearmost portion of the spring contact is inserted from the rear face forwardly into an intermediate space formed between the plurality of webs when the housing is closed by the housing cap.

\* \* \* \* \*